United States Patent [19]

Leung et al.

[11] 4,379,288
[45] Apr. 5, 1983

[54] MEANS FOR ENCODING IDEOGRAPHIC CHARACTERS

[76] Inventors: Daniel L. Leung; Lai-Wo S. Leung, both of 1260 Lawrence Ave., East, Don Mills, Ontario, Canada, M3A 1C4

[21] Appl. No.: 129,350

[22] Filed: Mar. 11, 1980

[51] Int. Cl.³ .............................. G06F 3/02; B41J 5/00
[52] U.S. Cl. .................................. 340/365 R; 400/110; 400/484
[58] Field of Search ............ 340/365 R, 365 E, 365 S; 364/200 MS File, 900 MS File, 518; 400/484, 110; 178/17 C, 30; 179/90 K

[56] References Cited

U.S. PATENT DOCUMENTS

| | | | |
|---|---|---|---|
| 2,526,633 | 10/1950 | Brumbaugh | 400/110 |
| 2,950,800 | 8/1960 | Caldwell | 400/484 |
| 3,319,516 | 5/1967 | Brown | 400/110 |
| 3,325,786 | 6/1967 | Shashoua et al. | 364/200 |
| 3,820,644 | 6/1974 | Yeh | 400/110 |
| 3,950,734 | 4/1976 | Li | 364/200 |
| 4,144,405 | 3/1979 | Wakamatsu | 178/30 |

OTHER PUBLICATIONS

*Journal of the Franklin Institute*, Caldwell, vol. 267, No. 6, p. 471–501, Jun. 1959.
IBM Technical Disclosure Bulletin, "Chinese Typewriter System", Dunham et al., vol. 19, No. 1, 1976, p. 320.
"Approaches to Chinese Character Recognition", Stallings, Pergamon Press, 1976, vol. 8, p. 87–98.
*IEEE Transactions*, "On-Line Computer Classification of Hand Printed Chinese Characters as a translation Aid", Groner et al., Dec. 1967, p. 856–860.

*Primary Examiner*—James J. Groody
*Attorney, Agent, or Firm*—Leon Arthurs; Kenneth M. Garrett

[57] ABSTRACT

A word processing system for Chinese type characters includes a keyboard with a generally standard key arrangement for encoding the characters in accordance with their basic stroke type and sequence. Up to eight basic stroke types may be employed, although a five stroke system is preferred. Recurrent code sequences of two, three, four and five strokes are identified. An "end of character" code may be generated with the space bar. Preferred sequences are assigned key positions so as to provide an ergonometrically efficient keyboard. Average typing speeds using the keyboard are comparable on a character/word basis to those for English.

19 Claims, 9 Drawing Figures

| STROKE | — | ⟋ | |丿 | ⟍ | 𠃍乚⟋ | FIG.1. |
|---|---|---|---|---|---|---|
| TYPE | 1 | 2 | 3 | 4 | 5 | GRONER et al. |

} PRIOR ART

| STROKE | — | \ | ⟋ | ⟍ | 丿 | ⟍ | ⟋ |
|---|---|---|---|---|---|---|---|
| TYPE | 1 | 2 | 3 | 4 | 5 | 6 | 7 |

FIG.2. YOSHIDA et al.

| STROKE | — | \| 丿 | 𠃋 \ ⟍ | ⟋ | 𠃍 乚 \ \ |
|---|---|---|---|---|---|
| TYPE | 1 | 2 | 3 | 4 | 5 |

| 叫 | | 冂 | 口 | 叱 | 叫 |
|---|---|---|---|---|---|
| (to) call | 2 | 25 | 251 | 2515 | 25152 |

Codeword for 叫 = 25152

FIG.5a.

| 鸟 | ⟋ | ⟋𠃌 | ⟋𠃌丶 | ⟋𠃌丶⟋ | ⟋𠃌丶⟋一 | 鸟 |
|---|---|---|---|---|---|---|
| bird | 3 | 35 | 354 | 3542 | 35425 | 354251 |

Codeword for 鸟 = 354251

FIG.5b.

| 闩 | 丶 | 丨 | 冂 | 闩 |
|---|---|---|---|---|
| (to) bolt | 4 | 42 | 425 | 4251 |

Codeword for 闩 is 4251

FIG.5c.

MEANS FOR ENCODING IDEOGRAPHIC CHARACTERS

FIELD OF INVENTION

This invention relates to improvements in method and apparatus for information processing. It particularly relates to improvements in such method and apparatus applicable for use in connection with Chinese type characters currently used in Chinese, Japanese and Korean script, which are commonly referred to as ideographs.

BACKGROUND OF THE INVENTION

The Chinese language is reported to comprise about 30,000 characters. Some 8,000 are listed in a commonly used Chinese-English dictionary, these being sufficient for modern Chinese prose. A vocabulary of about 3,000 characters accounts for 95% of the characters in every day use. Telegraph code books are limited to about 9,600 characters.

The 30,000 characters that comprise the writing system of the Chinese language are a heterogenous set, and were created at different stages of the development of the language. The pronunciation, in general, has been assigned arbitrarily to the characters, and the strokes from which the characters are composed have no syntactic meaning in themselves. The characters are not amenable to classification in a well structured system. The traditional Chinese dictionary arrangement method is in accordance with radicals and strokes comprising the character. The system has many deficiences. There are 214 different radicals listed in the Kang Hsi dictionary, and it is sometimes difficult to determine the radical group to which a character is related, especially when it is not a phonetic compound or a complex ideograph. Looking up a character is tedious and involves some six steps. Also, there is considerable degeneracy, with up to 30 characters having the same radical-stroke number characteristic.

A second system that is sometimes used is one wherein the four corners of the character are assigned a number in accordance with the stroke types and configuration of the strokes in that corner. The rules are relatively complicated, and mis-coding frequently occurs. Degeneracy is also a problem; for example, in the 2000-2999 section of the four corner code table in the Xinhua Zidian (New Chinese Dictionary) 1971, there are 1599 characters defined by 885 codes.

The Pinyin method of classification was introduced in Beijing (Peking) in the 1950's. The method involves a standardized phonetic system of representation using the Latin letters and tone indicators. The assignment of phonetic values necessitates a knowledge of the official dialect (Mandarin), and also subtle differences in the sound and tone must be discerned in many characters. Pinyin spelling of characters involves considerable degeneracy.

Other systems of classification are also known, serving for different purposes. The telegraph code lists some 9,600 characters numerically, thus avoiding degeneracy entirely. However, the list is accessed by operator search, or memory in the case of commonly used characters, hence the system is slow and requires considerable training. More recently, Caldwell, U.S. Pat. No. 2,950,800, proposed a system based upon the type of stroke from which the characters are constructed, and the sequence thereof. Some 21 "basic" strokes were identified. Some degeneracy was observed, but this was relatively small in comparison to the more traditional systems. Moreover, the method did not necessitate a fine knowledge of the Chinese written language or a particular dialectic manner of pronunciation, hence it could be open for widespread use.

Once a Chinese character is converted into a code signal, such signal may be employed in an information processing system such as communication, printing, translation and machine control. Thus, Caldwell described an electro-mechanical keyboard device for inputting the code elements into an accumulator. The concatenated code elements in the accumulator were then converted into X-Y coordinates so as to select and control the position of a film matrix upon which the preformed characters were stored, whereby the selected coded character could be optically printed. More recently micro-processor developments would readily permit the construction of electronic analogues embodying Caldwell's system, such as shown by Shashoua et al, U.S. Pat. No. 3,325,785. Still more recently in accordance with well known procedures, writing instructions converted from code signals may be for CRT, LED or "liquid crystal" display, or for printing such as impact printing, matrix wire printing, hot point printing or jet printing, for example. Also, whilst such instructions may relate to writing pre-formed character, they may relate to instructions for synthesising such characters. A simple synthesis was proposed by Li, U.S. Pat. No. 3,950,734 wherein a "prefix" and "suffix" were combined to form a character. More complex systems of synthesis in accordance with the stroke type and spatial configuration of the strokes are also known, for example as in the electronic system designed by Wakamatsu, U.S. Pat. No. 4,144,405, or in the various mechanical systems that have heretofore been proposed.

It is important to note here that the kinds of strokes for synthesis of the character for writing purposes are not well-defined. Most strokes are not known by name to the average Chinese writer, and the classification of such strokes into types is quite arbitrary. Whilst Caldwell defined and employed 21 such basic writing stroke types for encoding purposes, it has been recognized heretofore that a small number of stroke types would suffice for this purpose. A summary of different stroke types for coding systems which have heretofore been proposed is given by Stallings, "Pattern Recognition", Pergamon Press, Vol 8 pp 87–98 (1976). Cheung and Chan, in "Computer-aided instruction in Chinese characters" Proc. 1st Int. Symposium on Computers and Chinese Input/Output Systems, 599–616 (1973) identify some 31 different stroke types. Liu, in "Real Time Chinese Hand Writing Recognition Machine" MIT Cambridge, E.E. Thesis, 1966 identifies 19 stroke types. Yoshida and Eden, in "Handwritten Chinese Character Recognition by an Analysis-by-Synthesis Method". Proc. 1st Int. Conference on Pattern Recognition, 197–204 (1973) identify 7 stroke types, and Groner et al, "On-line computer classification of handprinted Chinese characters as a translation aid" IEEE Trans Elect. Comput. 16, pp 856–860 (1967) propose 5 types. The 7 stroke types and the 5 stroke types coding methods are referred to in greater detail subsequently herein.

A keyboard for encoding characters in accordance with stroke type and sequence may permit touch typing of the characters. Using his definition of 21 stroke types, Caldwell designed a keyboard with 21 "stroke keys", each assigned to one stroke type. However it was at once apparent that the speed attainable with such design would be, character for word, low in comparison to the average typing speed in English language on a Qwerty keyboard, the average strokes per character being about 10, and the average number of keystrikes per English word being about 5.

Caldwell reduced the number of keystrokes per character by two expedients. The first was termed "minimum spelling", whereby the length of the code word (that is, the sequence of code elements corresponding to the stroke types) for a character was truncated so as to just distinguish the character from other characters comprising the vocabulary list, whilst avoiding redundancy. For example, when an operator keyed in the code word BGD EGV BDP BDP BGE GE, the keyboard would lock after the seventh key had been hit, as the further information was not required to distinguish the character from the remaining characters comprising the vocabulary list. In an expanded vocabulary list containing the code word BDG EGV BDP BDP BGE GF, which differs from the above example in the last code element only, all of the code elements are required to avoid degeneracy. It is apparent that the applicability of "minimum spelling" in reducing the length of code words is very much dependent upon vocabulary size. The second expedient was the addition of "entity keys", which keys generate a signal corresponding to a sequence of strokes as opposed to one stroke. Some 20 different "entities" were described, each representing several strokes in specific spatial arrangement, often that of a radical or having other syntactical significance. From his relatively small vocabulary of 2,333 characters, Caldwell reported a reduction of the median value of 10.2 strokes per character to 6.7 using the "minimum spelling" method. When using a small sample drawn from the aforementioned vocabulary, Caldwell estimated the average number of keystrokes necessary to enter a character making full use of the "entity keys" was 4.7, which coincides quite closely to the average word length in the English language. However, after a suitable period of training, the typing speed on such a keyboard was reported by Caldwell to be only 14 characters per minute. Such typing speed is, of course, much less than is considered average for typing English words.

We consider that stroke coding systems for Chinese type characters which employ highly discriminating "basic" strokes have inherent disadvantages which tend to limit the attainment of good typing speeds. For example, certain strokes have a close resemblance to other strokes; this may be conducive to error in coding, and considerable effort must be expended on the part of the typist to distinguish between the types. Further, whilst there is no theoretical limit to the number of word encoding keys which may locate on a keyboard, there would appear to be a practical limit beyond which touch typing becomes increasingly difficult. As a first approximation it is not believed to be desirable to exceed the 26 letter keys of a Qwerty keyboard. Thus, whilst Caldwell identified some 20 different "entities", only 6 were assigned a key position, together with the 21 "basic" stroke keys. This restriction on the number of keys severely limits the applicability of the entity keys, since the percentage of characters of an expanded vocabulary list which may be encoded using the assigned "entity" keys is necessarily limited. Still further, in accordance with Information Theory, an optimal coding system should have a set code elements each of which is used an approximately equal number of times when coding an average text. A 21 basic stroke code system is far from optimal since, as stated by Caldwell, "90% of all Chinese writing is accounted for by only 9 of the 21 basic strokes". (op. cit.) The shortest uniform length binary signals that could be assigned to each of these stroke types would be 5 bits, and would be highly redundant. Hence, Caldwell employed Huffman's method of constructing minimum redundancy codes of non-uniform lengths (D. A. Huffman, "A method for the construction of Minimum-Redundancy Codes", Proc. I.R.E., 40, pp. 1098-1101, 1952). Such non-uniform length signals for code elements are used in serial transmission of information, and pose no problems for large computers with large accumulators. However in smaller information processing systems where the accumulators commonly have 8 to 16 bits, additional circuits and components are required before such code signals can be processed.

OBJECT OF INVENTION

It is an object of the present invention to provide an efficient system of coding to facilitate the inputting of information representing Chinese type characters into a information processing system.

It is an object of our invention to provide an improved information processing system for writing Chinese type characters.

It is a further object of out invention to provide improved keyboard apparatus for use in the above system.

SUMMARY OF INVENTIVE ASPECTS

In accordance with one embodiment of the invention, an apparatus for encoding Chinese type characters in accordance with their basic stroke type and sequence comprises a keyboard having not more than eight "monographic" keys and a plurality of "digraphic" keys. A "monographic" key is defined here to be representative of a single basic stroke type. A "digraphic" key is defined to be representative of a sequence of two basic strokes, which may be identical or otherwise. Means is provided responsive to the actuation of each "monographic" key for generating a code signal representative of the basic stroke associated therewith, which means is responsive to the actuation of each "digraphic" key for generating a code signal representative of the sequential basic strokes associated therewith.

In a preferred aspect of the invention, the number of basic keys representing basic stroke types is limited to five, and the stroke types are classified by simple geometric properties, as is described herein.

In accordance with another aspect of the invention, the keyboard includes in addition to the monographic and digraphic keys a plurality of keys having a graphicity of more than two, e.g. three, four or five. In a preferred form, the selection of the polygraphic keys (which expression includes digraphic) for inclusion on the keyboard is made primarily in accordance with their stroke saving function, as defined herein. In accordance with a still further aspect of the invention, the selected keys are assigned positions on the keyboard so as to provide a keyboard of good ergonometric efficiency.

The above mentioned and other features and objects of our invention and the manner of obtaining them will become more apparent and the invention itself will be best understood by reference to the following description of an embodiment of the invention taken together with the accompanying drawing wherein:

BRIEF DESCRIPTION OF THE DRAWINGS

FIG. 1 shows the stroke types of a first prior art code arrangement;

FIG. 2 shows the stroke types of a second prior art code arrangement;

FIG. 3 shows the stroke types which we preferably employ herein for character coding purposes;

FIG. 4 shows certain strokes which are treated exceptionally for character coding purposes;

FIGS. 5a, 5b and 5c show examples of Chinese characters encoded in accordance with the code system illustrated in FIG. 3;

DESCRIPTION OF A PREFERRED EMBODIMENT

Figure 6:
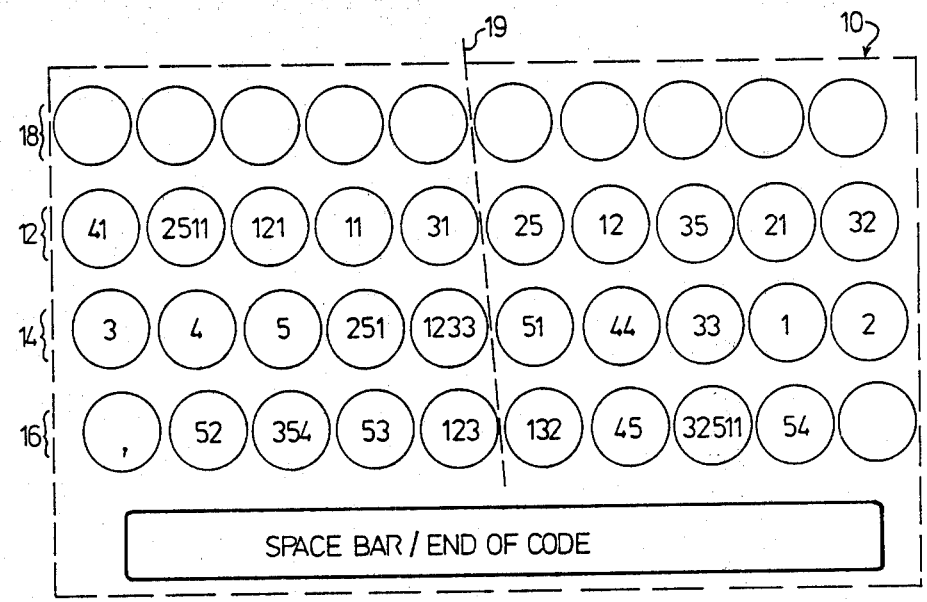
FIG. 6 shows a keyboard arrangement in accordance with this invention.

Referring to FIG. 1, there is shown therein the five basic stroke types proposed by Groner et al, loc. cit. for the purpose of encoding Chinese type characters. In FIG. 2 there is shown the seven elements proposed by Yoshida et al, loc. cit. for this purpose. It is to be remarked that the above authors employed a tablet inputting means necessitating pattern recognition techniques by the computer to identify the stroke types. The above basic strokes are not necessarily suitable for use in connection with the present invention, but they are illustrative of codes which may be represented by three characteristic bits.

The particular classification of basic stroke types that we identify for coding purposes and which seems well suited to our invention is shown in FIG. 3. These basic stroke types are as follows:

| TYPE | STROKE(S) |
|------|-----------|
| 1 | horizontal |
| 2 | vertical, optionally with left hook |
| 3 | left or right obliques and curves |
| 4 | dot |
| 5 | angulated strokes sustaining an acute or right angle |

Three strokes are illustrated in FIG. 4 that are treated as an exception. These strokes are conventionally considered as one-stroke executions; however, in accordance our preferred method of coding, these are considered as being composed of two basic strokes of the types indicated.

Examples of characters encoded in accordance with our basic stroke types are shown in FIG. 5:

FIG. 5a: (to) call; code sequence 25152
FIG. 5b: bird; code sequence 354251
FIG. 5c: (to) bolt; code sequence 4251

The above described five basic stroke types are defined in such manner as to facilitate easy recognition, and also such that the frequencies of occurrence for each of the five stroke types are approximately equal so as to optimize the efficiency of the coding system and allow for the efficient use of uniform length signals for representation of code elements.

An analysis of Chinese type characters coded in accordance with the code elements defined in FIG. 3 indicates that certain code sequences of two or more elements are recurrent. The samples that we employed for analysis were excerpted from recently published materials of diverse contents from books, newspapers and magazines. Separate samples of 5,250 characters were analysed as described below, and we found that all the frequencies pertinent to our design are stabilized at this sample size; that is, these samples of about 5,000 characters are statistically representative of modern Chinese prose. Four such samples totalling 21,000 characters were analysed in detail.

A value we refer to as the Stroke Saving Function (SSF) in accordance with the following definition was calculated for each code sequence of significance that was identified in the above analysis $$SSF = f(n-1)$$

where f is the frequency of occurence of the given sequence and n is the number of code elements in the sequence. In calculating the SSF value, any character with distinct left and right parts is considered to comprise two disconnected code sequences rather than one continuous code sequence. For example, the character illustrated in FIG. 5a having a code sequence 25152 is treated for the purpose of calculating the SSF as comprising separate sequences 251 and 52. This is the natural manner that an operator would tend to treat such character, and is analogous to the preference to spell English words in syllables. The hundred or so most commonly occuring code sequences identified in the above analysis were investigated and preliminary SSF values calculated therefor. The sequence having the highest SSF value was then "selected" and identified by a specific designation whereby in subsequent calculation shorter code sequences comprised in the "selected" sequence would not be encountered, and whereby in longer code sequences which include the selected sequence, the selected sequence would be considered as comprising a single code element.

To illustrate the concept, assume that in a hypothetical sample of 40 characters, the character with code word "251" occurs 20 times, the character with code word "2511" occurs 10 times, and the character with code word "4125" occurs 10 times. Preliminary SSF values are determined as follows:

| CODE SEQ | FREQUENCY | S.S.F. VALUE |
|----------|-----------|--------------|
| "25" | 20 from code word "251" 10 from code word "2511" 10 from code word "4125" | $(20+10+10) \times (2-1) = 40$ |
| "51" | 20 from code word "251" 10 from code word "2511" | $(20+10) \times (2-1) = 30$ |
| "251" | 20 from code word "251" 10 from code word "2511" | $(20+10) \times (3-1) = 60$ |
| "2511" | 10 from code word "2511" | $(10) \times (4-1) = 30$ |
| "4125" | 10 from code word "4125" | $(10) \times (4-1) = 30$ |

From the above, it is seen that the greatest SSF value is 60, being that attaching to the code sequence "251". If it now be assumed that this sequence is "selected" and represented by the symbol "*", the sequences of the above example may be identified as "25", "51", "*", "*1", "4125".

The SSF values attaching to the newly defined sequences are determined as follows:

| CODE SEQ. | FREQUENCY OF OCCURRENCE | S.S.F. VALUE |
|---|---|---|
| "25" | 0 from code word "*" | |
| | 0 from code word "*1" | |
| | 10 from code word "4125" | $(10) \times (2-1) = 10$ |
| "51" | 0 from code word "*" | |
| | 0 from code word "*1" | $(0) \times (2-1) = 0$ |
| "*" (previously "251") | 20 from code word "*" | $(20) \times (1-1) = 0$ |
| "*" (previously "2511") | 10 from code word "*1" | $(10) \times (2-1) = 10$ |
| "4125" | 10 from code word "4125" | $(10) \times (4-1) = 30$ |

In accordance with the newly calculated SSF values the code sequence "4125" would be next "selected" as having the highest SSF value, and the process of calculation repeated for the remaining sequences. It should be understood that in the above example the frequencies and the SSF values calculated therefrom are illustrative only of the concept, and that they do not bear any quantitative significance. In practice the SSF value of the code sequence "4125" is relatively low, and the sequence is not observed amongst the code sequences having the top 30 SSF values. It may also be noted that in practice the SSF value of "selected" sequences would not be recalculated in the manner shown, since a sequence, once selected, is defined for recalculation purposes as comprising a single code element (n = 1) for which the SSF value has no significance.

As will be appreciated from the above, the determination of the Stroke-saving Function values is a non-linear process heavily dependent on which code sequences have already been selected, and for test purposes the number of sequences investigated is desirably greater than the number to be selected.

A list of 28 code sequences in generally descending order of SSF values as determined in accordance with the foregoing principles is given in Table 1 below

TABLE 1

| Code sequences having highest SSF values | | | | | | | | | |
|---|---|---|---|---|---|---|---|---|---|
| 251 | 33 | 121 | 12 | 44 | 35 | 53 | 11 | 52 | 32 |
| 2511 | 41 | 51 | 21 | 354 | 32511 | 1233 | | 31 | 45 |
| 54 | 132 | 123 | 331 | 453 | 533 | 111 | 551 | 25 | |

TABLE 1: Code sequences having highest SSF values

It should be noted that there are relatively small differences only in the SSF values associated with the last several sequences listed, and it is again stressed that the values associated with the sequences will be dependent upon the "selected" sequences, hence some change in the order, particularly towards the lower end, may be found.

The polygraphic sequences of code elements such as are given in Table 1 are not intended to define the spatial arrangement of the strokes, and the significance thereof may vary from character to character. This is illustrated by the codes of the characters defined in FIGS. 5a, 5b and 5c where in each instance the trigraphic code sequence of 251 occurs. In FIG. 5a this sequence represents the radical  "mouth". In FIG. 5b this same sequence represents an arrangement of strokes having no syntactical significance. In FIG. 5c the same sequence represents a still further arrangement of strokes differing from those of FIG. 5a and 5b and again having no syntactical significance. In this respect, then, the sequences do not correspond to the "entities" of strokes defined by Caldwell, such "entities", it being recalled, being representative of a defined and specific spatial arrangement of strokes normally having a syntactical significance. Thus whilst Caldwell proposed an entity key representative of the radical "mouth", and such key would be of utility in encoding the character of FIG. 5a, such utility would not extend to encoding the strokes comprising the characters of FIGS. 5b and 5c.

Whilst the limitation of the number of basic stroke types used for code purposes has considerable significance in assisting stroke type identification as earlier discussed, such limitation has further significance in relation to an ergonometric-efficient keyboard. Given a standard Qwerty keyboard with 44 keys, let it be assumed that 10 such keys are assigned to input numerals and 4 to input special instructions and punctuations; there will then remain 30 keys for character and machine function coding purposes. If 21 such keys are required for encoding basic stroke, there will be available only 9 keys to which polygraphic code sequences may be assigned. In a 21 basic stroke coding system there is a total of 441 digraphic sequences ($21^2$) that are theoretically possible, hence it will be apparent that only a relatively small proportion of the digraphic sequences could be assigned a key position. Also, in such system the stroke saving functions of the various code sequences are generally low due to the comparatively low value of f, the frequency with which a sequence recurs. In comparison, in our preferred 5 basic stroke system, there may be up to 25 keys available for assignment to polygraphic sequences, whereby all of the 25 possible digraphic code sequences might be assigned key positions. However we prefer a more efficient keyboard where those polygraphic sequences generally having the highest stroke-saving function values are assigned to the available keys. Twenty-eight of these sequences are listed in Table 1.

Referring to FIG. 6, a "standard" keyboard is identified therein by the numeral 10. As used herein, "standard" refers to a key arrangement wherein there are provided three horizontally arranged ranks of keys identified as upper rank 12, middle rank 14 and lower rank 16, wherein all character coding keys are located. Generally there are some ten keys in each rank. In a Qwerty key arrangement, the twenty six letters of the Latin alphabet are assigned standard positions in these three ranks, the four remaining keys being assigned punctuation functions. Other keys to the left of the left hand keys and to the right of the right hand keys may also be present; these keys are generally assigned machine operation, punctuation or special symbol functions. These additional keys are not normally used for character coding purposes. Still further keys may be present and are here shown as a rank 18 superior to upper rank 12, and are used for inputting the numerals 0–9 and/or symbols. This rank of keys is shown without specific designation appearing thereon so as to avoid any confusion in the ensuing description. Such numerical value inputting keys may commonly be formed as a separate array in a computer input keyboard. There is no fixed limit to the number of keys on a "standard" keyboard, but the maximum number is usually about 50.

For touch typing of words (which expression here includes Chinese type characters) the word writing keys are to be considered as preferably consisting of a left hand and a right hand sphere of operation, the keys being divided accordingly by an imaginary line 19. "Home" finger positions are located on middle rank 14 and comprise the four keys of each hand commencing one key removed from line 19. In the Qwerty keyboard assignment such eight home keys are identified as "A,S,D,F" and "J,K,L,;". Our standard Chinese character coding keyboard includes monographic keys for entering basic strokes, and polygraphic keys for entering sequences of basic strokes, selection of the sequences for inclusion on the keyboard being determined from the ranking of their SSF values as earlier discussed. The assignment of the exact location for each of the aforementioned keys, both monographic and polygraphic, is determined by studies of the "mono-strike" and "dual-strike" frequencies of these keys. The "mono-strike" frequency of a key, whether a monographic or a polygraphic key, is the frequency of that key being hit in coding Chinese characters from a properly selected sample reflecting the average Chinese prose. The "dual-strike" frequency is the frequency of occurrence of a sequence of two keys, whether monographic or polygraphic, in a similar sample as described.

To achieve maximum ergonomic efficiency in the keyboard design, the work loads of both hands are distributed approximately equally, that is, the sum total of the "mono-strike" frequencies of all the keys for the left hand is about the same as the right. Also, the work load, i.e. the sum of "mono-strike" frequencies, for each finger is distributed directly proportionally to the strength and tapping speed of that finger. Furthermore, the keys with the highest "mono-strike" frequency, which in our studies include all five basic keys, are assigned to the most accessible keys, namely the home keys. Lastly, pairs of keys that have high "dual-strike" frequencies are arranged so that the two keys of each pair are assigned to opposite hands, such that the operation of successive keys by alternate hands be maximized.

We prefer to identify the keys in accordance with a code or code sequence corresponding to the basic stroke or sequence of basic strokes assigned to the keys, arabic numerals being preferred for this purpose in view of their easy recognition. It will be appreciated that the single digit number used to identify a basic stroke is arbitrary.

The various code elements assigned to the character coding keys of keyboard 10 in general accordance with the above principles may be seen in FIG. 6. It may be observed from a comparison of this Figure with Table 1 that the sequences "25" and "123" have been assigned keyboard positions in preference to others of nominally superior SSF value; in practice it was found that such keys were preferred by an operator to other possible keys of approximately equal SSF value. Also in keyboard 10 an "end of code" designation is assigned to the space bar of the keyboard. It will be apparent that the left and right hand spheres of operation of key board 10 may be interchanged without unduly influencing the ergonomic efficiency of the key board; expressed otherwise, the key positions illustrated in FIG. 6 could be transposed in accordance with their mirror image position.

Key board 10 having a coded key arrangement shown in FIG. 6 was used in a word processing system for the typing of Chinese type characters to be described and was subject to a performance test by an operator. A text limited to 350 characters was selected, such characters being of varying degrees of complexity such as would be found in a text of wider scope. After several sessions totalling only 20 hours of practice, the operator attained a speed of 50 characters per minute. This is almost 4 times faster than the only reported speed for the operation of a Chinese keyboard device of 14 characters/minute. Inputting of the coding required an average of 3.76 coding key-strikes/character plus 1 strike for the space bar, to denote the end of the character code, hence the keying speed compares very favourably to typing an English language text after an extended training period. It was found that the frequency of use of the polygraphic keys by the trained operator was quite close to that of the optimal result computed. The average number of strokes/character in the selected text was about 7.29, hence each key strike represented about 1.94 strokes of a Chinese character.

Figure 7:
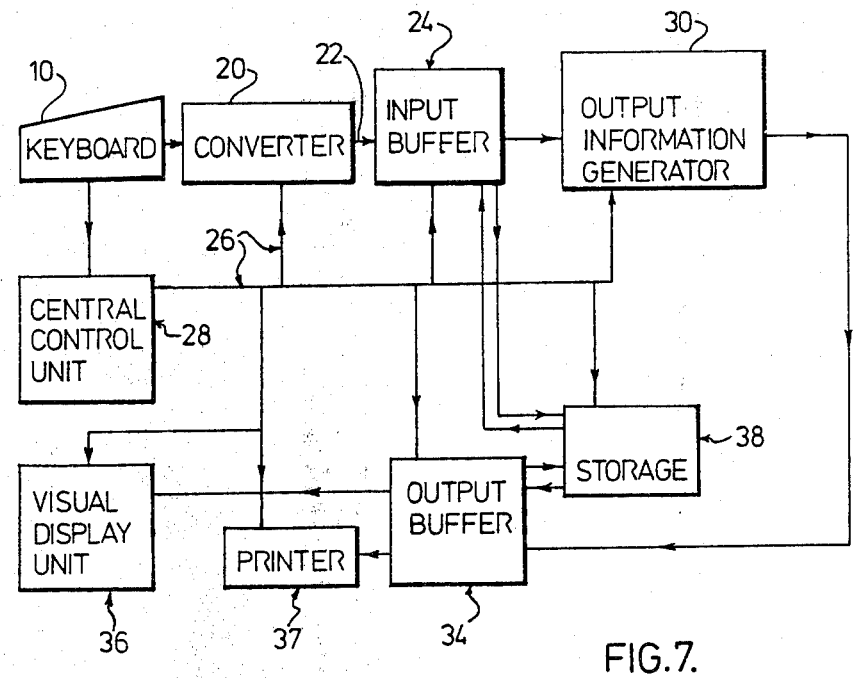
FIG. 7 shows in schematic form a word processing system embodying the present invention.

An exemplary Chinese character word processing system including keyboard 10 is indicated schematically in FIG. 7. The system further comprises a converter 20 which generates a bit pattern corresponding to the code or code sequences represented by a key struck on keyboard 10. Such bit pattern is preferably generated in simple binary code.

The bit pattern generated by the actuation of a monographic key can be assigned to 3 significant bits in our preferred arrangement wherein there are 5 stroke types plus one "stop" code to designate the end of a code word, and there will be 2 bit patterns left undefined in the 8 possible bit patterns. Alternately, the code elements can be concatenated in an accumulator, and three such code elements can be assigned to one byte, taking up 216 (i.e. $6^3$) of the 256 possible bit patterns, leaving 40 bit patterns for alphabets, numerals, or other coded instructions. Other alternatives are possible, such as starting each Chinese code word at the beginning of a byte, and assigning 3 code element to a byte, thus using up only 180 of the 256 possible bit patterns, leaving 76 for other codes. Arrangements as such can be varied and are generally known in the art.

To take full advantage of the increasingly popular and economical 8-bit microprocessors and integrated memory circuits, uniform length code signals of not longer than 8 bits are required. All the above listed possible binary code signal patterns are of uniform lengths. In a coding system of 6 code elements (5 stroke types plus a stop code), the average number of bits per code element is 2.25

$$\left( \frac{6 \text{ bit patterns}}{8 \text{ possible bit patterns}} \times 3 \text{ bits} \right).$$

In the prior art system of 21 strokes, the average number of bits per code element is 3.4375

$$\left( \frac{22 \text{ bit patterns}}{32 \text{ possible bit patterns}} \times 5 \text{ bits} \right).$$

Thus, our invention provides a 1.53 (3.4375÷2.25) times improvement in memory space requirement and processing speed when uniform length code signals are used. This significant improvement in efficiency is achieved by a well designed stroke type classification which extracts the most distinguishing properties of the strokes in Chinese characters. Also, this efficiency is achieved by a relatively uniform distribution of stroke type frequencies, which is considered a more optimal code system according to information theory.

The generated bit patterns are routed via bus 22 to an input buffer 24 which provides temporary storage for editing purposes, and in the case of several keyboards sharing the same output information generator 30, provides storage until the latter is available.

The keyboard 10 also permits keyboard input of control instructions via the central control unit 28 to the various processing units of the word processing system, via control lines 26 for functions such as deletion or addition of certain bit patterns during editing and correction, or control of information flow to and from various units.

The binary machine words representing the code words for Chinese characters are converted in the output information generator 30 into the appropriate forms of information. The matching of the binary code word to the output information may be by one of the many well documented algorithms, such as the "hashing" method, for example. The output information will also vary according to the purpose of information process system, and may comprise for example X-Y coordinates of the location of a character stored in tangible form on film, disc or tape, or may be writing instructions for producing hardcopies, such as instructions to matrix printers and ink jet printers, for example. In the case of keyboard controlled movable type printing system, the output information can be the control signals to select the type of a particular Chinese character; or in the case of telecommunication, the output information can be the corresponding signals in minimum redundancy codes for telegraphic transmission. Combinations of the various information types may of course be utilized in the same Chinese information processing system.

The information from the output information generator is received in an output buffer 34, which stores the information temporarily, permitting suitable material to be viewed on a video monitor 36, or light emitting diode array, or liquid crystal display, for example. This is desirable in permitting the operator to examine the outputted material before any permanently printed copy is made, or the information transmitted, so as to allow text editing, correction and selection between characters having identical codes. Output buffer 34 further permits time storing of storage means, and production of a hardcopy by a printer 37. Storage means 38 is connected to both input buffer 24 and output buffer 34 whereby information in either code word form or in output information form that had been earlier generated in accordance with the foregoing may be stored and later examined and/or printed or transmitted.

We claim:

1. Apparatus for encoding Chinese type characters in accordance with their basic stroke type and sequence comprising a keyboard having a plurality of up to eight inclusive of monographic keys, and a plurality of digraphic keys, key responsive means responsive to the actuation of each said monographic key for generating a code signal representative of a basic stroke and to the actuation of each said digraphic key for generating a code signal representative of a sequence of said basic strokes of two.

2. Apparatus in accordance with claim 1, wherein the number of monographic keys is five.

3. Apparatus in accordance with claim 1, wherein the number of digraphic keys is about fifteen.

4. Apparatus in accordance with claim 1, further including a plurality of trigraphic keys, and wherein said key responsive means is responsive to the actuation of each said trigraphic key for generating a code signal representative of a sequence of said basic strokes of three.

5. Apparatus in accordance with claim 4, wherein the number of said trigraphic keys is about five.

6. Apparatus in accordance with claim 4, wherein the stroke sequence assigned to each digraphic and trigraphic keys is selected from two and three stroke sequences generally having the highest stroke-saving function values.

7. Apparatus in accordance with claim 4, further including at least one tetragraphic key and at least one pentagraphic key, and wherein said key responsive means respectively generates a code signal representative of a sequence of said basic strokes of four and five.

8. Apparatus as defined in claim 4, wherein said keys are assigned to positions locating in three horizontal ranks, each rank consisting of about 10 said keys.

9. Apparatus as defined in claim 4, wherein said keys are assigned to positions locating in three horizontal ranks, and wherein said monographic keys locate in finger positions in the middle rank remote from the central keys thereof.

10. Apparatus as defined in claim 4, wherein each said character encoding key has an indicium thereon in the form of an arabic numeral, each said monographic key having a single digit numeral indicative of the basic stroke type represented by said key, and each said key having a graphicity of greater than one having a sequence of single digit numerals in accordance with the sequence of basic strokes represented by that key.

11. Apparatus as defined in claim 4, including a space bar, and wherein said key responsive means is responsive to the actuation of said space bar to generate an end of code signal.

12. A keyboard for encoding Chinese type characters in accordance with five basic strokes and the sequence thereof comprising three horizontal ranks, each rank comprising about ten keys wherein all character coding keys locate, wherein five said keys locating in positions in the middle rank are monographic and representative of a basic stroke, and about twenty three said keys are polygraphic, representative of a sequence of basic strokes of two or more, at least a portion of said polygraphic keys being digraphic, means responsive to the actuation of said keys to generate a code signal representative of the stroke or sequence of strokes represented thereby.

13. A keyboard apparatus in accordance with claim 12, wherein the polygraphic code sequence represented by said polygraphic keys are those code sequences selected from all possible code sequences generally having the highest stroke saving function values.

14. A keyboard in accordance with claim 12 wherein said polygraphic keys include about fifteen digraphic keys, about five trigraphic keys, at least one tetragraphic key and at least one pentagraphic key.

15. A keyboard apparatus in accordance with claim 13, wherein the keys are assigned to positions on the keyboard as determined generally in accordance with their monostrike frequency and dual strike frequency.

16. A keyboard apparatus in accordance with claim 13, wherein each monographic key locates in the middle rank remote from the central keys thereof.

17. A keyboard apparatus in accordance with claim 13, including a space bar representative of an "end of character".

18. Apparatus as defined in claim 1, 2 or 4, further including output information means responsive to the input of said code signals, writing means responsive to said output information means.

19. Apparatus defined in claim 12, 13 or 14 further including output information means responsive to said code signals, writing means responsive to said output information means.

* * * * *